(12) United States Patent
Cuppett et al.

(10) Patent No.: US 9,105,427 B2
(45) Date of Patent: Aug. 11, 2015

(54) TELESCOPING CURRENT PATH STRUCTURE FOR DUAL TANK DEAD TANK CIRCUIT BREAKER WITH PARALLEL RESISTOR ASSEMBLY

(75) Inventors: Matthew Cuppett, Uniontown, PA (US); Morris Tampa, Greensburg, PA (US); Beth Dahm, Pittsburgh, PA (US); Carl Kurinko, North Huntingdon, PA (US); Brant Suhrie, Eire, PA (US)

(73) Assignee: ABB Technology AG, Zurich (CH)

( * ) Notice: Subject to any disclaimer, the term of this patent is extended or adjusted under 35 U.S.C. 154(b) by 241 days.

(21) Appl. No.: 13/616,574

(22) Filed: Sep. 14, 2012

(65) Prior Publication Data

US 2014/0076853 A1     Mar. 20, 2014

(51) Int. Cl.
*H01H 33/02*     (2006.01)
*H01H 31/02*     (2006.01)

(52) U.S. Cl.
CPC ................... *H01H 31/026* (2013.01)

(58) Field of Classification Search
USPC .................. 218/43–44, 51–59, 143
See application file for complete search history.

(56) References Cited

U.S. PATENT DOCUMENTS 3,665,134 A * 5/1972 Fischer ........................... 218/59
3,863,041 A * 1/1975 Rostron et al. .................. 218/43
3,983,346 A * 9/1976 Guaglione ....................... 218/51
4,027,125 A * 5/1977 Peek et al. ....................... 218/44
4,460,937 A * 7/1984 Kamata et al. ................. 361/604
5,245,145 A * 9/1993 Freeman et al. ............... 218/143
5,569,891 A * 10/1996 Freeman et al. ............. 200/17 R

FOREIGN PATENT DOCUMENTS

| FR | 2882852 A1 | 9/2006 |
| JP | H0750121 A | 2/1995 |
| WO | 2012038405 A1 | 3/2012 |

OTHER PUBLICATIONS

PCT Search Report & Written Opinion in PCT/US2013/058870 dated Dec. 13, 2013.

\* cited by examiner

*Primary Examiner* — Truc Nguyen
(74) *Attorney, Agent, or Firm* — Manelli Selter PLLC; Edward J. Stemberger

(57) ABSTRACT

Current path structure provides a current path between an interrupter assembly and a resistor assembly of a dead tank circuit breaker and includes an electrically conductive fixed support having first and second ends. The first end is fixed to one of the interrupter assembly or the resistor assembly. A substantially hollow, electrically conductive conductor has first and second ends, with a connector at the first end thereof. The connector is removably connected to the other of the interrupter assembly or the resistor assembly. Coupling structure removably couples the conductor with the fixed support such that when coupled, the current path structure is in an operative position electrically connecting the interrupter assembly with the resistor assembly, and when decoupled, the fixed support can be moved into telescoping relation within the conductor defining a collapsed position of the current path structure.

17 Claims, 6 Drawing Sheets

TELESCOPING CURRENT PATH STRUCTURE FOR DUAL TANK DEAD TANK CIRCUIT BREAKER WITH PARALLEL RESISTOR ASSEMBLY

FIELD

The invention relates to high-voltage dead tank circuit breakers having dual tanks and parallel resistor and interrupter assemblies and, more particularly, to telescoping current path structure permitting the resistor assembly or interrupter assembly to be removed from their respective tanks without the need to separate the tanks.

BACKGROUND

A common construction for an extra high voltage circuit breaker employs an outer housing which may be grounded (a dead tank) which has insulator bushings entering the tank at two spaced locations along its length. One or more modular interrupter assemblies supported in series are then connected between the interior portions of the insulating bushings.

It is common in such high voltage circuit breakers to employ a closing resistor since switching surges may be more severe than lightning overvoltages. Conventional closing resistors consist of a stack of resistor assembly disks or other elements in parallel with each of the interrupter breaks. The resistor contacts close before the interrupter contacts to pre-insert the resistor in the circuit. The main contacts close later to short circuit the closing resistor. The resistor contact is thereafter opened to remove the resistor from the circuit prior to reopening the interrupter contacts. The closing resistor reduces switching surge overvoltages on the line which otherwise might exceed the lightning basic insulation rating of the device.

Closing resistor assemblies are commonly located physically parallel with the interrupter assembly, with the interrupter assembly and the resistor assembly being disposed in their own separate tank. The dual tanks are joined together. With this configuration, to remove the resistor assembly or the interrupter assembly, the tanks must be separated.

Thus, there is a need to provide current path structure between an interrupter assembly and a resistor assembly in a dual tank, dead tank circuit breaker, permitting the resistor assembly or interrupter assembly to be removed without the need to separate the tanks from each other.

SUMMARY

An object of the invention is to fulfill the need referred to above. In accordance with the principles of the present invention, this objective is obtained by providing current path structure as a current path between an interrupter assembly and a resistor assembly of a dead tank circuit breaker. The circuit breaker has a pole assembly including a first tank, housing the interrupter assembly, and a second tank, in communication with the first tank and substantially parallel therewith, housing the resistor assembly. The current path structure includes an electrically conductive fixed support having first and second ends. The first end is constructed and arranged to be fixed to one of the interrupter assembly or the resistor assembly. The fixed support has an outside diameter. A substantially hollow, electrically conductive conductor has first and second ends, with a connector at the first end thereof. The connector is constructed and arranged to be removably connected to the other of the interrupter assembly or the resistor assembly. The conductor has an inside diameter greater than the outside diameter of the fixed support. Coupling structure is constructed and arranged to removably couple the conductor with the fixed support such that when coupled, the current path structure is in an operative position electrically connecting the interrupter assembly with the resistor assembly, and when decoupled, the fixed support can be moved into telescoping relation within the conductor defining a collapsed position of the current path structure.

In accordance with another aspect of the disclosed embodiment, a method is provided for moving a current path structure to provide clearance for removal of an interrupter assembly or a resistor assembly of a dead tank circuit breaker. The circuit breaker has a pole assembly including a first tank, housing the interrupter assembly, and a second tank, in communication with the first tank and substantially parallel therewith, housing the resistor assembly. The method provides current path structure to include an electrically conductive fixed support having first and second ends; a substantially hollow, electrically conductive conductor having first and second ends, with a connector at the first end thereof; and coupling structure removably coupling the conductor with the fixed support. The first end of the fixed support is fixed to one of the interrupter assembly or the resistor assembly. The connector is connected, in a removable manner, to the other of the interrupter assembly or the resistor assembly. The coupling structure is engaged to connect the conductor to the fixed support so that the current path structure is in an operative position electrically connecting the interrupter assembly with the resistor assembly. When the interrupter assembly or the resistor assembly needs to be removed without separating the tanks, the connector is disconnected, the coupling structure is disengaged, and the conductor is moved so that the fixed support is in telescoping relation within the conductor defining a collapsed position of the current path structure, thereby providing clearance for removal of the interrupter assembly or resistor assembly.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
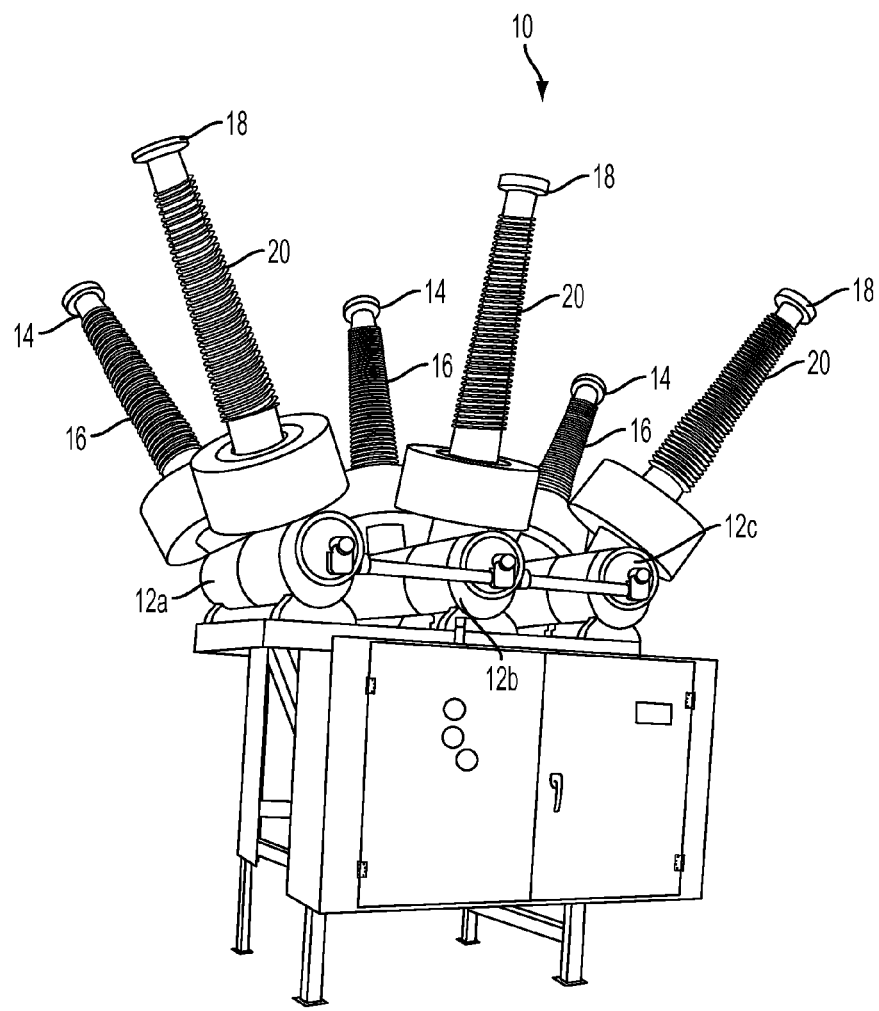
FIG. 1 is a view of a high voltage circuit breaker provided in accordance with an embodiment.

With reference to FIG. 1, a high-voltage, dead-tank circuit breaker is shown, generally indicated at 10. Circuit breaker 10 is preferably a three phase circuit breaker and thus includes three pole assemblies 12a, 12b and 12c. Each pole assembly 12 includes a first electrical conductor 14 carried in a first bushing 16 and a second electrical conductor 18 carried in a second bushing 20. Electrical power lines are coupled to the first and second electrical conductors 14 and 18, and the circuit breaker 10 selectively opens or closes the electrical connection there-between. It can be appreciated that the number of pole assemblies 12 can be selected for the desired application and need not be limited to three.

Figure 2:
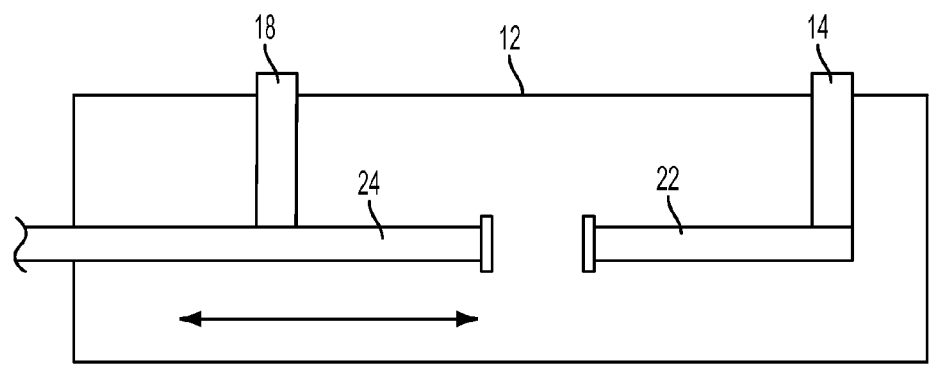
FIG. 2 is a schematic view of an interior of a breaker pole of the circuit breaker of FIG. 1, wherein the electrical contacts are open.

With reference to FIG. 2, a simplified view of an interior of a pole assembly 12 is shown, wherein first electrical conductor 14 is electrically connected to a stationary contact 22 which is immovably secured within pole assembly 12. Second electrical conductor 18 is electrically connected to a movable contact 24 which is carried within pole assembly 12 in a manner allowing longitudinal movement therein. Thus, in a first position, the movable contact 24 may be positioned to break the electrical connection between first the electrical conductor 14 and second electrical conductor 18 (FIG. 2). In a second position, the movable contact 24 may be brought into contact with stationary contact 22 to electrically connect the first electrical conductor 14 and the second electrical conductor 18. The interior space of pole assemblies 12 are sealed and generally adapted to minimize arcing between stationary contact 22 and movable contact 24. The interior volume of pole assembly 12 may be filled with dielectric material that preferably includes SF6, dry air, dry nitrogen, $CO_2$ or oil. Alternatively, a vacuum-type interrupter could be employed within the tank volume surrounded by dielectric materials mentioned.

Figure 3:
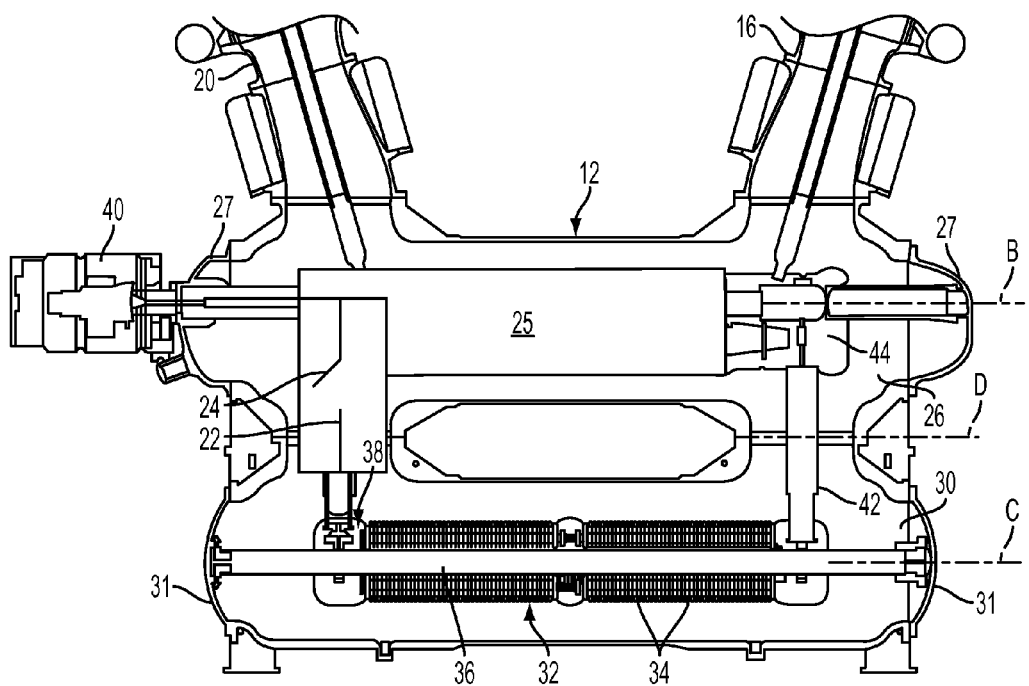
FIG. 3 is a view of an interior of a breaker pole of the circuit breaker of FIG. 1, showing a telescoping current path structure of an embodiment electrically connected between an interrupter assembly and a resistor assembly.

With reference to FIG. 3, the interior of a pole assembly 12 is shown. The assembly 12 includes a first tank 26 housing an interrupter assembly 25. The first tank 26 has a longitudinal axis B and removable end caps 27 at opposing ends of the tank 26. A second tank 30 houses a resistor assembly, generally indicated at 32. The second tank 30 has a longitudinal axis C that is substantially parallel to the longitudinal axis B. The second tank 30 has removable end caps 31 at opposing ends thereof. The interior of the tanks 26 and 30 communicate with each other and the tanks 26, 30 are sealed. The tanks 26, 30 can be joined together at axis D or may be of unitary construction. The resistor assembly 32 preferably includes a plurality of resistor discs 34 stacked on a resistor tube 36. End 38 of the resistor assembly 32 is electrically connected to the stationary contact 22. The resistor assembly 32 reduces the voltage transients generated when a no-load transmission line is energized of reenergized after a line fault. The resistor assembly 32 is operated by the same operating mechanism, generally indicted at 40, as the main contacts 22 and 24.

Figure 4:
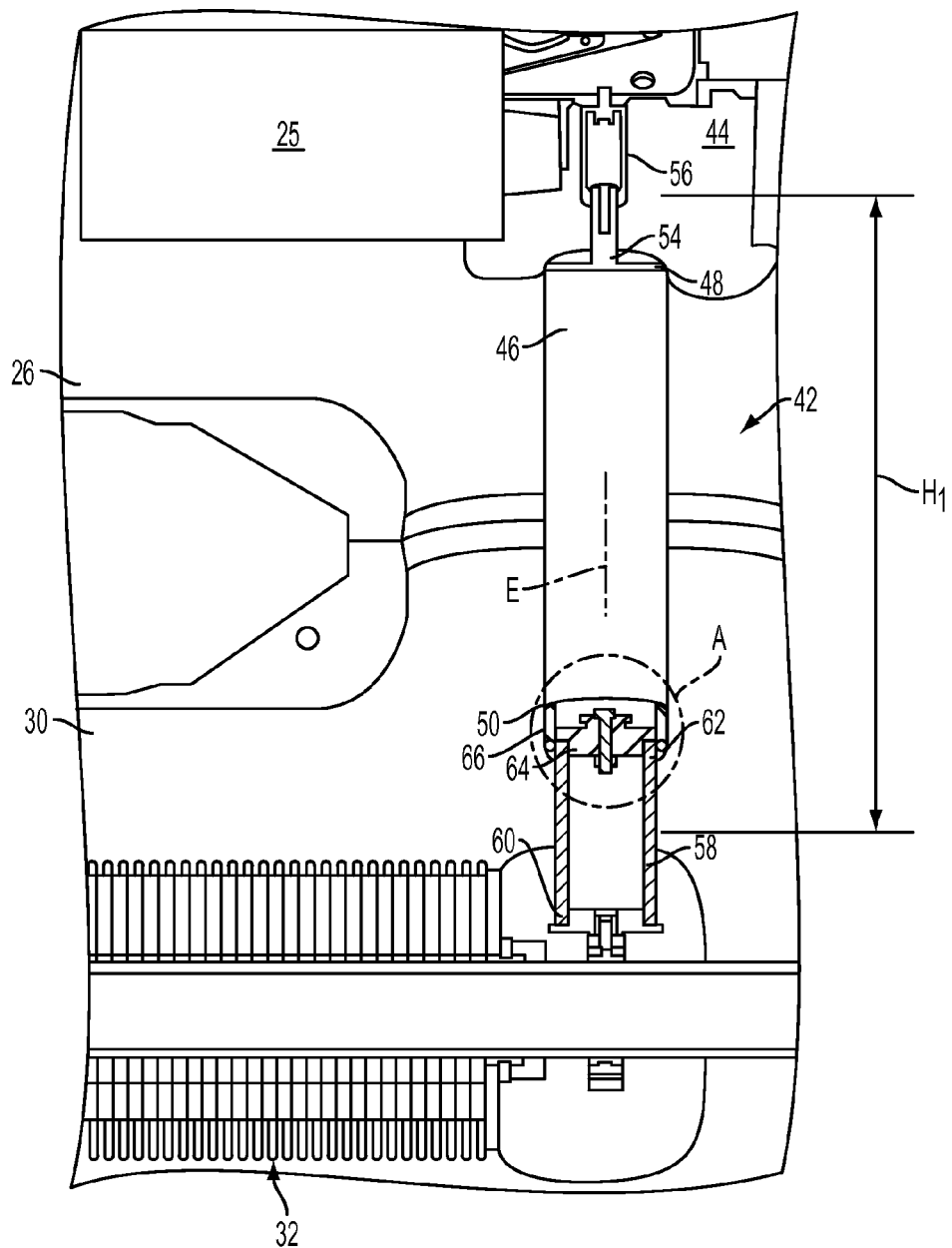
FIG. 4 is an enlarged view, partially in section, of the telescoping current path structure of FIG. 3.
Figure 7:
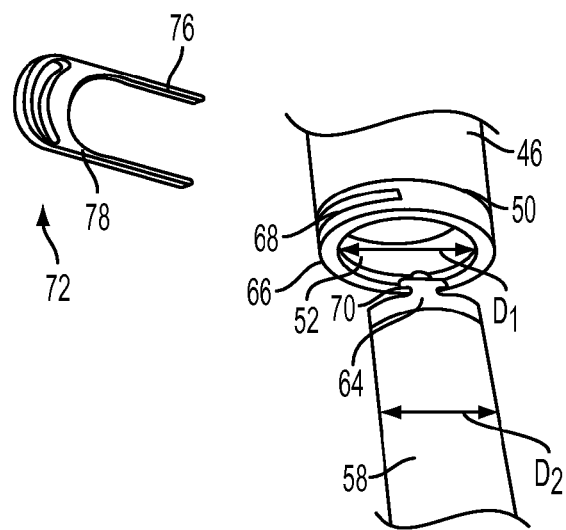
FIG. 7 is an exploded view showing inserting the locking clip of FIG. 6 to secure the sliding conductor to the fixed support of the telescoping current path structure of FIG. 3.

In accordance with an embodiment, current path structure, generally indicated at 42, provides an electrical current path between portion 44 of the interrupter assembly 25, and the resistor assembly 32. As best shown in FIG. 4, the current path structure 42 includes a sliding conductor 46 having a first end 48 and an opposing second end 50. The sliding conductor 46 is preferably a substantially hollow, tubular and electrically conductive member having an interior 52 (FIG. 7). An electrically conductive interrupter connector 54 closes the end 48 of the sliding conductor 46 and includes an arm 56 that engages a connection 56 of the interrupter portion 44. The connection 56 is constructed and arranged to ensure a removable electrical connection with the arm 56, as will be explained more fully below.

Figure 5:
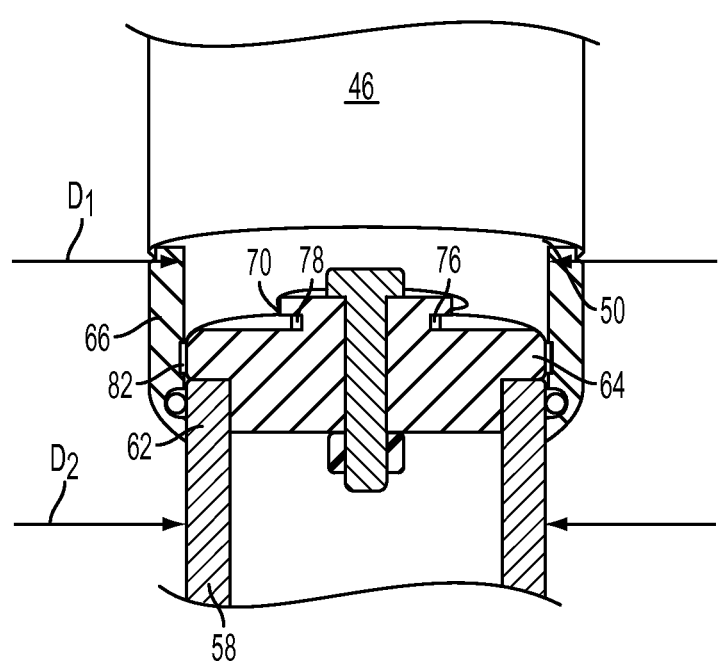
FIG. 5 is an enlarged view of the portion encircled at A in FIG. 4.

The current path structure 42 also includes an electrically conductive fixed support 58 that has an end 60 fixed with respect to the resistor assembly 32 and another end 62 extending from the resistor assembly 32. As best shown in FIG. 5, an end cap 64 is affixed to end 62 of the fixed support 58 and can be considered to be part of the fixed support 58.

In order to permit the interrupter assembly 25 or resistor assembly 32 to be removed from the associated tank without disassembly of the breaker 10, the current path structure 42 includes a telescoping feature. Thus, in accordance with an embodiment, a sliding contact 66 is affixed to the end 50 of the sliding conductor 46. The sliding contact 66 can be considered to be part of the sliding conductor 46. As shown in FIG. 5, the inside diameter $D_1$ of the sliding contact 66 is substantially equal to the inside diameter of the sliding conductor 46. $D_1$ is greater than the outside diameter $D_2$ of the fixed support 58 so that the fixed support 58 can telescope within the sliding conductor 46 and the sliding contact 66 as will be explained below.

Figure 6:
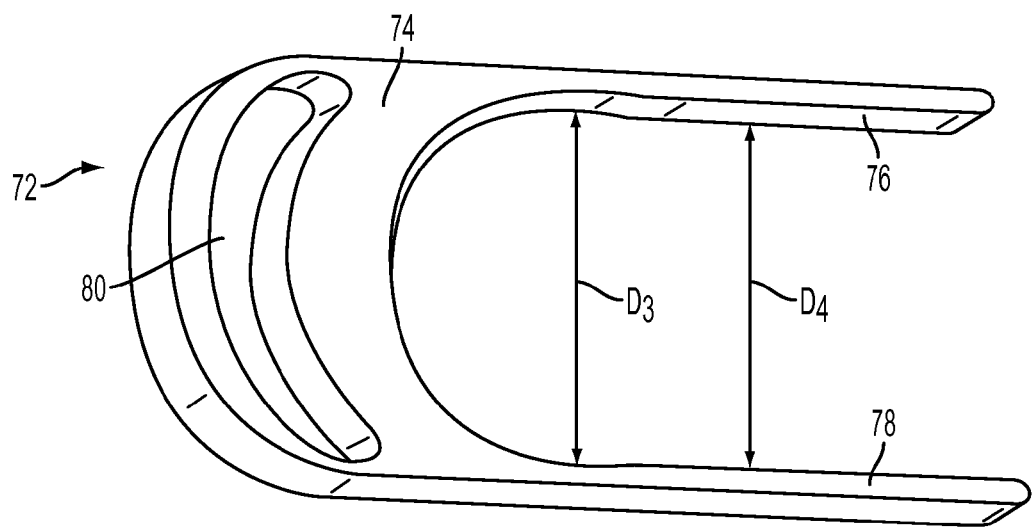
FIG. 6 is an enlarged view of a locking clip of the telescoping current path structure of FIG. 3.

The sliding conductor 46 is removably connected to the fixed support 58. In the embodiment and as best shown in FIG. 7, a slot 68 is provided in the sliding contact 66 so as to extend through the entire wall thereof so as to communicate with the interior 52. The end cap 64 includes a grooved portion 70 extending about a circumference of a portion of the end cap 64. With reference to FIGS. 5 and 7, the connection between the sliding conductor 46 and the fixed support 58 is made by inserting the sliding contact 66 over the end cap 64 so that the slot 68 aligns with the grooved portion 70. A self-locking clip, generally indicated at 72 in FIGS. 6 and 7, is inserted into the slot 68. The clip 72 holds the sliding conductor 46 in place by engaging the grooved portion 70. The clip 72 and grooved portion 70 define removable coupling structure of the embodiment.

As shown in FIG. 6, the clip 72 has a base 74 and first and second legs 76, 78 extending from the base 74 in spaced relation so as to be on opposing sides of the grooved portion 70. The clip 72 may be of the type disclosed in commonly owned, U.S. application Ser. No. 13/192,785, entitled, "Self-Locking Connector Clip", filed on Jul. 28, 2011, the contents of which is hereby incorporated by reference into this specification. The clip 72 has a self-locking feature when engaging the surface of the end cap 64 defining the grooved portion 70 since, as shown in FIG. 6, $D_3 > D_4$. The clip 72 also preferably includes an opening 80 in the base 74 for griping the clip 72 so that no tools are needed to insert or remove the clip 72. When the clip 72 is in place, the current path structure 42 is in an operative position providing an electrical current path between the interrupter 25 and the resistor assembly 32. In the operative position, the current path structure 42 has a height $H_1$ (FIG. 4).

Figure 8:
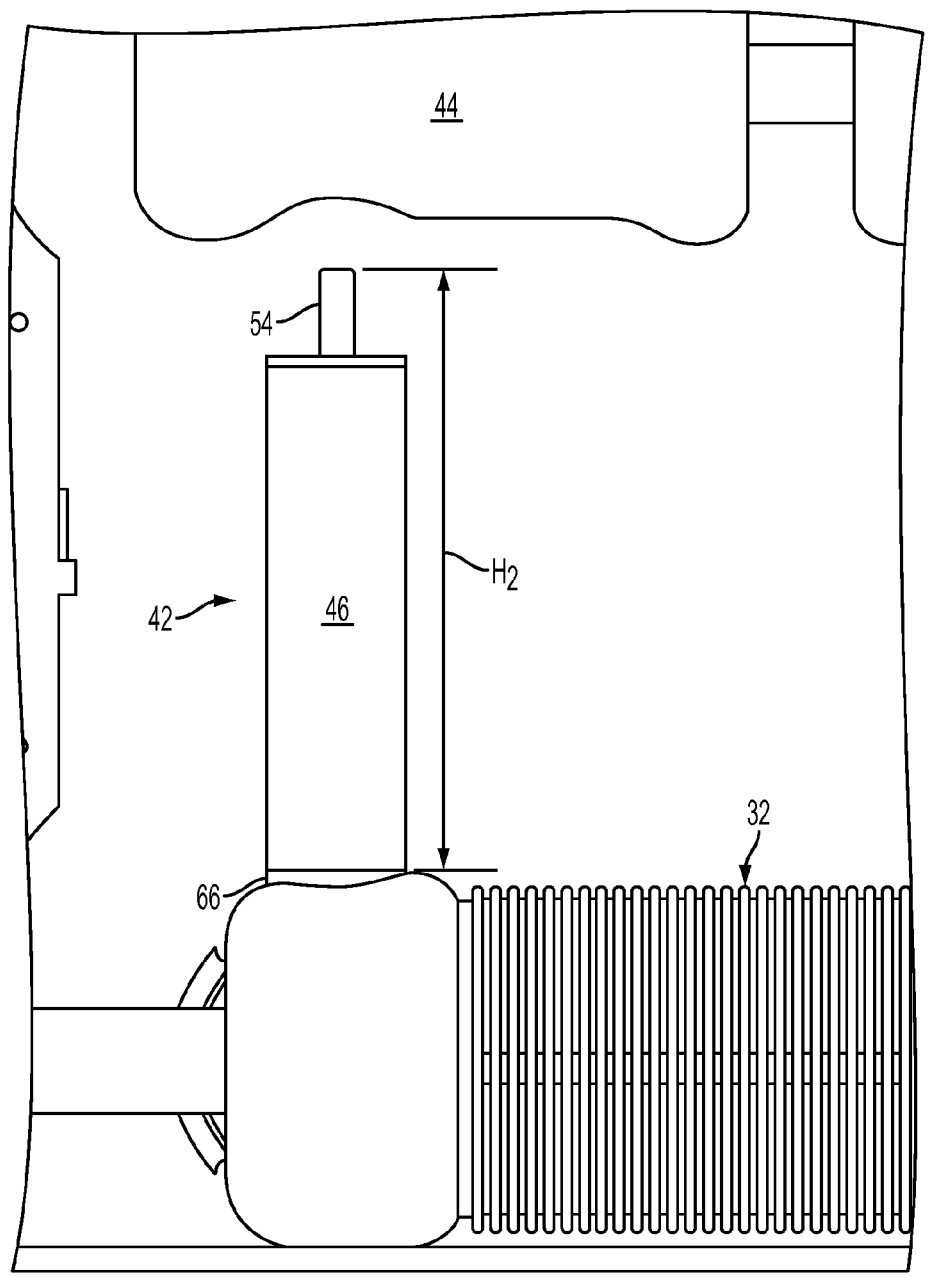
FIG. 8 is a view of the telescoping current path structure shown in a collapsed position, disengaged from the interrupter assembly.

To disassemble or service the resistor assembly 32 or interrupter assembly 25, with reference to FIG. 4, the arm 54 of the sliding conductor 46 is removed from the connection 56 with the interrupter assembly 25. Connection 56 can include another clip-grooved portion connection as described above, or any other removable connection. Next, the clip 72 is removed from engagement with the grooved portion 70 of the end cap 64. The sliding conductor 46 is then pushed downwardly along longitudinal axis E (perpendicular to axes B and C) to a collapsed position over the fixed support 58 so that the fixed support 58 is in telescoping relation within the sliding conductor 46 and the sliding contact 66. As best shown in FIG. 5, a non-metal guide 82 is coupled to the inner periphery of the sliding contact 66 to provide a non-metal interface between the sliding contact 66 and the fixed support 58 which minimizes scratches which would otherwise occur due to metal on metal sliding. As shown in FIG. 8 (a rear view as compared to FIG. 4), in the collapsed position, the height $H_2$ is substantially less than $H_1$ (FIG. 4).

Once in the collapsed position, there is clearance for the interrupter assembly 25 or resistor assembly 32 to be removed from their respective tank 26, 30, without the need to separate the tanks 26, 30.

It can be appreciated that instead of connecting components as in FIG. 4, the fixed support 58 can be fixedly connected with the interrupter assembly 25 and the arm 54 of the sliding conductor 46 can be removably connected to the resistor assembly 32.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Current path structure for providing a current path between an interrupter assembly and a resistor assembly of a dead tank circuit breaker, the circuit breaker having a pole assembly including a first tank, housing the interrupter assembly, and a second tank, in communication with the first tank and substantially parallel there-with, housing the resistor assembly, the current path structure comprising:

an electrically conductive fixed support having first and second ends, the first end being constructed and arranged to be fixed to one of the interrupter assembly or the resistor assembly, the fixed support having an outside diameter, a substantially hollow, electrically conductive conductor having first and second ends, with a connector at the first end thereof, the connector being constructed and arranged to be removably connected to the other of the interrupter assembly or the resistor assembly, the conductor having an inside diameter greater than the outside diameter of the fixed support, and coupling structure constructed and arranged to removably couple the conductor with the fixed support such that when coupled, the current path structure is in an operative position electrically connecting the interrupter assembly with the resistor assembly, and when decoupled, the fixed support can be moved into telescoping relation within the conductor defining a collapsed position of the current path structure.

2. The current path structure of claim 1, wherein the conductor includes a sliding contact fixed to the second end thereof, the sliding contact having an inside diameter substantially equal to the inside diameter of the conductor.

3. The current path structure of claim 2, wherein the sliding contact includes a non-metal guide on an inner periphery thereof for engagement with the fixed support when moved to the collapsed position.

4. The current path structure of claim 2, wherein the fixed support includes an end cap at the second end thereof, the end cap including surfaces defining a grooved portion therein, the sliding contact including a slot there-through, a clip being provided through the slot and engaged with the grooved portion in the operative position, the clip being disengaged with the grooved portion in the collapsed position, wherein the grooved portion and the clip define the coupling structure.

5. The current path structure of claim 4, wherein the grooved portion extends circumferentially about a portion of the end cap and the clip includes a base, and a pair of legs extending from the base, the legs being in spaced relation.

6. The current path structure of claim 1, wherein a height of the current path structure in the collapsed position is less than a height of the current path structure in the operative position.

7. The current path structure of claim 1, in combination with the resistor assembly and the interrupter assembly, the current path structure having a longitudinal axis disposed perpendicularly with respect to a longitudinal axis of each of the tanks.

8. The combination of claim 7, wherein the first end of the fixed support is fixed to the resistor assembly and the connector is removably connected to the interrupter assembly.

9. A method of moving a current path structure to provide clearance for removal of an interrupter assembly or a resistor assembly of a dead tank circuit breaker, the circuit breaker having a pole assembly including a first tank, housing the interrupter assembly, and a second tank, in communication with the first tank and substantially parallel there-with, housing the resistor assembly, the method comprising:

providing current path structure to include an electrically conductive fixed support having first and second ends; a substantially hollow, electrically conductive conductor having first and second ends, with a connector at the first end thereof; and coupling structure removably coupling the conductor with the fixed support, fixing the first end of the fixed support to one of the interrupter assembly or the resistor assembly, connecting, in a removable manner, the connector to the other of the interrupter assembly or the resistor assembly, engaging the coupling structure to connect the conductor to the fixed support so that the current path structure is in an operative position electrically connecting the interrupter assembly with the resistor assembly, and when the interrupter assembly or the resistor assembly needs to be removed without separating the tanks, disconnecting the connector and disengaging the coupling structure and moving the conductor so that the fixed support is in telescoping relation within the conductor defining a collapsed position of the current path structure, thereby providing clearance for removal of the interrupter assembly or resistor assembly.

10. The method of claim 9, wherein the step of providing the current path structure provides the conductor with a sliding contact fixed to the second end thereof, the sliding contact having an inside diameter substantially equal to the inside diameter of the conductor, with the fixed support having an outside diameter less than the inside diameter.

11. The method of claim 10, wherein the sliding contact includes a non-metal guide on an inner periphery thereof, the method further comprising:

permitting the guide to contact the fixed support when the conductor is moved.

12. The method of claim 9, wherein moving the conductor includes pushing the in conductor in an axial direction over the fixed support.

13. The method of claim 10, wherein the fixed support includes an end cap at the second end thereof, the end cap including surfaces defining a grooved portion therein, the sliding contact including a slot there-through, wherein the engaging step includes inserting a clip through the slot into engagement with the grooved portion, and wherein the disengaging step includes removing the clip from engagement with the grooved portion.

14. The method of claim 13, wherein the grooved portion extends circumferentially about a portion of the end cap and the clip includes a base, and a pair of legs extending from the base, wherein the engaging step includes providing the legs on opposing sides of the grooved portion.

15. The method of claim 9, wherein a height of the current path structure in the collapsed position is less than a height of the current path structure in the operative position.

16. The method of claim 9, wherein the step of fixing the first end of the fixed support includes fixing the first end of the fixed support to the resistor assembly and the step of connecting the connector includes connecting the connector to the interrupter assembly.

17. The method of claim 9, wherein the current path structure is connected between the interrupter assembly and the resistor assembly so that a longitudinal axis of the current path structure is disposed perpendicularly with respect to a longitudinal axis of each of the tanks.

\* \* \* \* \*